Jan. 15, 1957  B. E. O'CONNOR  2,777,543
DAMPER WITH FLUID INERTIA MOTOR
Filed Feb. 9, 1952  2 Sheets-Sheet 1
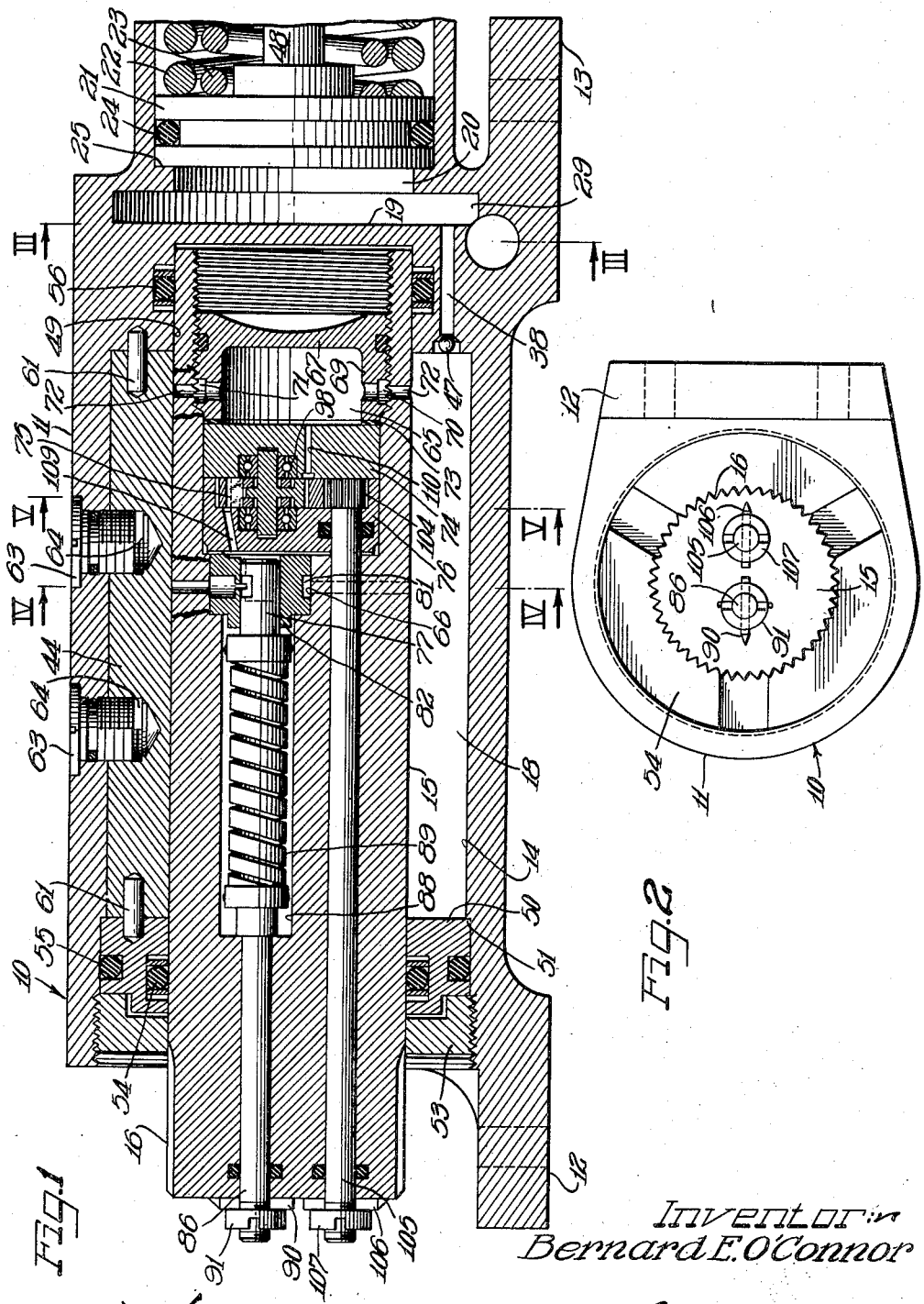
Inventor:
Bernard E. O'Connor Jan. 15, 1957  B. E. O'CONNOR  2,777,543
DAMPER WITH FLUID INERTIA MOTOR
Filed Feb. 9, 1952  2 Sheets-Sheet 2

Inventor:
Bernard E. O'Connor

United States Patent Office 2,777,543
Patented Jan. 15, 1957

2,777,543

DAMPER WITH FLUID INERTIA MOTOR

Bernard E. O'Connor, Buffalo, N. Y., assignor to Houdaille Industries, Inc., a corporation of Michigan Application February 9, 1952, Serial No. 270,803

10 Claims. (Cl. 188—93)

This invention relates to improvements in flutter dampers adapted to eliminate the flutter of the pivoted adjustable stabilizer and airfoil attachments of aircraft, such as the elevators, ailerons, wing flaps and the like.

A principal object of my invention is to provide a novel and improved form of rotary piston hydraulic flutter damper structure arranged with a view toward utilizing the relationship of the inertia of the damping fluid to the overall elasticity of the system and the damping fluid therein for effectively damping out the flutter of the pivotally adjustable airfoil parts of aircraft in a more efficient manner than formerly, without an increase in the size or weight of the parts of the damper.

Another object of my invention is to provide a flutter damper of the rotary vane piston type having a fluid inertia motor in the displacement passage from one working chamber of the damper to the other, displacing the damping fluid under conditions of controlled inertia and combining this fluid inertia motor with an energy absorbing displacement passage to increase the efficiency of the damping structure without increasing its size.

Still another object of my invention is to provide a flutter damper of the hydraulic rotary piston type wherein a vane type piston and cylinder move relatively with respect to each other to damp out the vibration of the movable airfoil attachments of the aircraft and wherein the elasticity of the system and the damping fluid are utilized by a fluid inertia motor in the fluid displacement passageways between oppositely acting working chambers of the damper.

A further object of my invention is to provide a flutter damper for aircraft of the rotary piston type having a vane type of piston rotatably mounted within a cylinder divided into working chambers between the vanes of the piston, and wherein the energy of the fluid displaced from one chamber to the other is absorbed by a restricted fluid passageway and the inertia of the damping fluid is utilized to increase the efficiency of the damping effect in passing through an artificial elongated passageway from one opposed working chamber to another.

Still another object of my invention is to provide a novel and improved flutter damper for aircraft wherein a rotary vane type piston is mounted within a cylinder and wherein dividers extending inwardly from the inner wall of the cylinder define working chambers with the vanes of the piston and are so arranged as to reduce lateral flexing of the dividers upon the exertion of pressure thereagainst, during operation of the damper.

These and other objects of my invention will appear from time to time as the following specification proceeds and with reference to the accompanying drawings, wherein:

Figure 1 is a schematic longitudinal sectional view taken through a flutter damper constructed in accordance with my invention, showing the fluid replenishing cylinder and piston broken away;

Figure 2 is an end view of the flutter damper looking toward the end thereof, which in Figure 1 is the left-hand end thereof;

Figure 4:
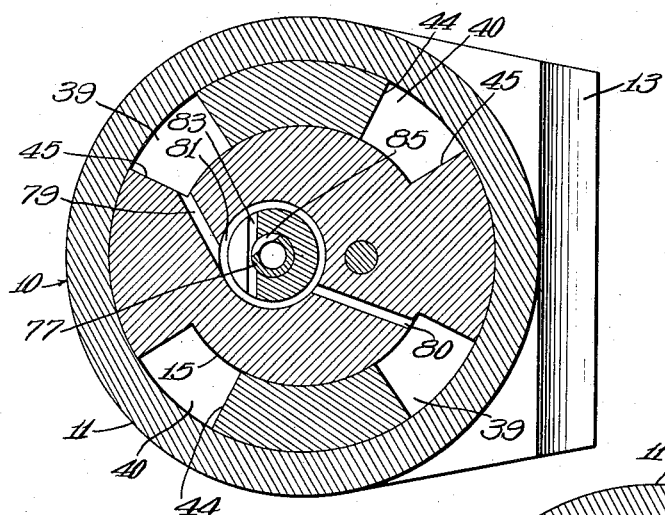
Figure 4 is a transverse sectional view taken substantially along line IV—IV of Figure 1.
Figure 5:
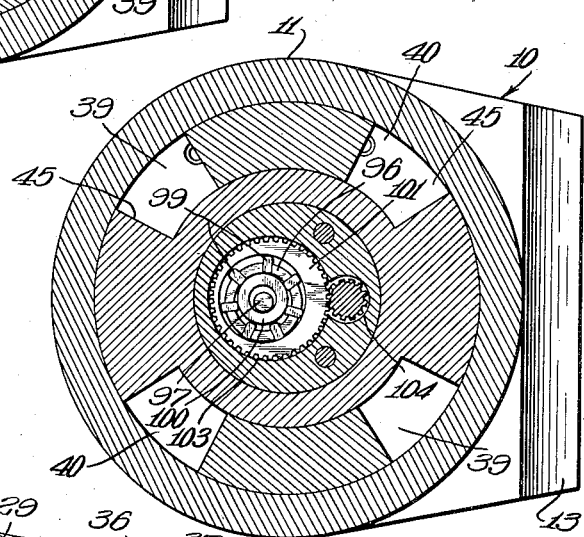
Figure 5 is a partial transverse sectional view taken substantially along line V—V of Figure 1.

In the embodiment of my invention illustrated in the drawings, reference character 10 illustrates generally a flutter damper constructed in accordance with my invention and capable of being contained in free working relation within the front or joint portion of a movable control surface member of an airplane airfoil assembly, such as an elevator or wing (not shown) to dampen the tendency of the airfoil assembly to flutter.

The flutter damper 10 comprises an elongated housing 11, which may be mounted coaxially with the hinge axis of a pivoted airfoil member and may be attached thereto by means of attachment flanges 12 and 13, which may be attached to suitable brackets (not shown) carried interiorly of the movable control member of the airplane. The housing 11 may thus be rigidly secured to the movable control member of the airplane for rocking movement about the axis of movement of the control member as the latter swings or tends to swing or flutter.

The flutter damper 10 is of a rotary vane hydraulic piston type operating on the principle of compensating for the elasticities in the system by an artificial fluid passageway and the absorption of energy by a metered and valved control of the displacement of hydraulic fluid between opposed working chambers, and permitting relatively free intentional movement of the control structure, but resisting vibrational or sudden or rapid movements of the control structure.

The housing 11 is provided with an interior cylindrical wall 14 defining a cylindrical chamber 18 within which is mounted a rotary vane piston, or wing shaft 15. The rotary vane piston 15 has a splined or serrated outer end portion 16 serving as a means for attachment to a corresponding internally splined or serrated attachment (not shown) adapted to be attached to a stationary portion of the airfoil member. The wing shaft or rotary piston 15 is thus stationary while the housing 11 is rotatably movable about said wing shaft in accordance with movements of the movable airfoil member. It is, of course, obvious that the arrangement may be reversed and the housing 11 may be stationary while the rotary piston may be movable with respect to said housing.

The housing 11 has an intermediate wall 19 defining the inner end of the chamber 18, which also forms an end wall of a replenishing chamber 20 extending from the chamber 18 in axial alignment therewith. The replenishing chamber 20 is shown as having a piston 21 movable therein and biased toward the end wall 19 by a pair of concentric pre-load compression springs 22 and 23.

An O-ring 24 is shown as being recessed between the lands of the piston 21 to prevent the leakage of fluid thereby. Said piston is shown as abutting an annular shoulder 25 when at the end of its replenishing stroke. The replenishing piston 21 operates on principles similar to that illustrated and described as a joint invention with Benjamin Fuente, in application Serial No. 209,444, filed February 5, 1951, so not herein further shown or described.

Hydraulic fluid is introduced into the damper 10 and replenishing chamber 20 through a passageway 27 which may be drilled to intersect the outer wall of an enlarged diameter 29 of the replenishing chamber 20 and having a check valve structure therein. The check valve structure is shown as including a cylindrical valve body 30 threaded in the drilled passageway 27 and shown as opening to the end of the passageway 27 and into the enlarged diameter chamber portion 29. An axial passageway 31 extends through said valve body from the outer end thereof and communicates with the interior thereof. The inner end of said axial passageway is engaged by a valve element 32, which is urged into engagement with the end of said passageway by a compression spring 33 seated at its outer end on a spider 34 carried by an inturned inner end portion 35 of said valve body. A threaded plug 36 having a resilient sealing member 37 carried on its inner end is provided to seal the outer end of the drilled passageway 27 from the leakage of fluid therethrough, upon filling of the damper unit.

Hydraulic fluid under pressure passes from the replenishing chamber 20 into the chamber 18 through passageways 38, 38 to opposed working chambers 39 and 40 within the cylindrical chamber 18. The working chambers 39 and 40 are defined by opposite edges of diametrically opposed fluid reaction members or dividers 44, 44 and the adjacent edges of vanes or wings 45, 45 of the wing shaft 15, as will hereinafter more clearly appear as this specification proceeds. Check valves 47, 47 are provided in the passageways 38, 38 to prevent the back flow of fluid into said replenishing chamber upon operation of the damper.

When the replenishing chamber 20 is filled with hydraulic fluid under sufficient pressure to maintain fluid within the working chambers 39, 39 and 40, 40 and to move the piston 21 outwardly against the compression springs 22 and 23, said piston will continually exert sufficient pressure on the fluid within the replenishing chamber 20 to maintain the working chambers 39, 39 and 40, 40 filled with fluid at all times during the operation of the device. If desired, a pston rod 48 may extend from the piston 21 outwardly beyond the end of the housing member 11, and may be sealed with respect thereto. Said piston rod may have indicia marks thereon (not shown) to indicate the amount of fluid within the replenishing chamber 20.

The rotary vane piston or wing shaft 15 is shown as being rotatably mounted within a reduced diameter inner end portion 49 of the chamber 18 at its inner end and as being rotatably mounted within an end block 50 at its outer end. The end block 50 is shown as being held in engagement with a shoulder 51 of the cylindrical wall 14 by an externally threaded ring nut 53. O-rings 54 and 55 are shown as being recessed within the inner and outer peripheries of the end block 50 and as engaging the wing shaft 15 and wall 14 to prevent the leakage of fluid thereby. The inner end of the wing shaft 15 is shown as being sealed to the inner wall of the reduced diameter portion 49 of the chamber 18, as by an O-ring 56.

The wings 45, 45 are shown as being diametrically opposed and as conforming to and slidably engaging the cylindrical wall 14 at their outer ends. The fluid reaction members or dividers 44, 44 are shown as conforming to the inner periphery of the cylindrical wall 14 and as slidably engaging the cylindrical surface of the wing shaft 15 between the wings 45, 45 thereof. Said fluid reaction dividers are shown as being located in diametrically opposed relationship by locating pins 61, 61 mounted in opposite ends of the associated dividers 44 and registering with corresponding apertured portions formed in the inner end wall of the chamber 14 and the inner end of the end block 50. The fluid reaction dividers 44, 44 with the wings 45, 45 thus divide the chamber 18 into the complemental working chambers 39, 39 operating in opposed relationship to the complemental working chambers 40, 40.

Due to the fact that the working pressures within the working chambers 39, 39 and 40, 40 are exceptionally high, the dividers 44, 44 have a tendency to flex transversely of their longitudinal axes, resulting in a distortion of the dampening effect and providing a certain undesirable elasticity within the working chambers. This tendency of the dividers 44, 44 to flex laterally is herein shown as being avoided by large diameter machine screws or plugs 63, 63 spaced along the chamber 14 inwardly from the ends thereof and threaded through the outer wall of the housing 11 from the outer side thereof and within drilled and threaded holes 64, 64 in the dividers 44, 44. The spacing of the plugs 63, 63 along the dividers 44, 44 is such as to cooperate with the locating pins 61, 61 and hold said dividers from lateral flexing at a plurality of points and thus assure sufficient rigidity thereof to have substantially no elasticity when subjected to heavy operating stresses.

The wing shaft 15 is herein shown as having a central fluid displacement chamber 65 of a relatively large diameter extending inwardly therealong from its inner end and disposed axially of said shaft and communicating with a smaller diameter valve chamber 66, herein shown as being eccentric of the longitudinal axis of said shaft, although not necessarily so related with respect to said shaft.

A closure plug 67 is shown as being threaded in the outer end of the fluid displacement chamber 65 and as having an annular wall 69 having an annular fluid passageway 70 formed in the periphery thereof and communicating with radial passageways 71, 71 leading through said wall. The annular passageway 70 registers with radial fluid passageways 72, 72 leading outwardly through the wing shaft 15 and communicating with the working chambers 40, 40. The inner end of the annular wall portion 69 of the end closure plug 67 is shown as abutting a sealing ring or packing 73 engaging the outer end face of a bearing support block 74 of a fluid motor 75. The fluid motor 75 is herein shown as being a rotary vane type of fluid motor and, while relatively small, is highly efficient and the small fluid displacement of this motor takes the place of a fluid inertia passage of considerable length, with a resultant increase in efficiency of the dampening effect, as will hereinafter more clearly appear as this specification proceeds. The bearing block 74 is shown as abutting a casing member 76 for the motor 75 and is held in abutting engagement with the inner end wall thereof by the end closure plug 67. The bearing block 74 and casing member 76 thus form a casing and bearing supports for the fluid motor 75.

Fluid under pressure is displaced from the working chambers 39, 39 through a restrictive orifice valve 77 carried within the valve chamber 66 in the interior of the wing shaft 15. Displacement ports 79 and 80 lead from the working chambers 39, 39 from locations adjacent the inner pressure faces of the wings 45, 45 to an annular passageway 81 formed in the periphery of an orifice body 82 for the restrictive orifice valve means 77. The annular passageway 81 communicates with a slit-like chordal control orifice 83 extending transversely of the orifice body 82, and shown as intersecting the orifice control valve 77 rotatably mounted in the center thereof.

The orifice control valve 77 is of a generally cylindrical form having an open inner end communicating with a chordal slit 85 extending within and having communication with the slit-like chordal control orifice 83. Turning of the orifice control valve 77 within the orifice body 82 will thus vary the cross-sectional passageway area between the chordal orifice 83 and the chordal slit 85 and vary the restriction of the flow of fluid through said slits and out the valve through the hollow interior thereof to the inertia motor 75.

The orifice control valve 77 is turned within the orifice body 82 by means of a rod 86 extending within the wing shaft 15 from the outer end thereof into a chamber 88, communicating with and in axial alignment with the valve chamber 66. A spiral bi-metal thermostatic element 89 is secured at one of its ends to the inner end of the rod 86 and is rotatably moved thereby. The opposite end of the thermostatic element 89 is secured to the outer end of the orifice control valve 77, so that turning movement of the rod 86 will rotate the orifice control valve 77 through the spiral thermostatic element 89.

As shown in Figure 1, a rectangular pin 90 extends through the outer end of the rod 86 and abuts the outer end face of the wing shaft 15. The end of said pin may be pointed and may serve as a pointer and cooperate with certain indicia on the outer face of the wing shaft 15 to enable the position of the orifice control valve 77 to readily be determined. A slotted annular nut 91 is shown as being threaded on the outer end of the rod 86 into engagement with the rectangular pin 90 to afford a means for turning the rod 86 and the orifice control valve 77 through the thermostatic element 89.

The orifice control valve 77 is thus adjustably moved through the spiral thermostatic element 89, and said thermostatic eelment affords a means for compensating for the variations in temperature encountered in the service of the flutter damper in an airplane. The spiral thermostatic element affords a means for compensating trol valve to restrict or open the orifice from a mean temperature rated adjustment to compensate for changes in viscosity of the damping fluid as the temperature changes.

Figure 3:
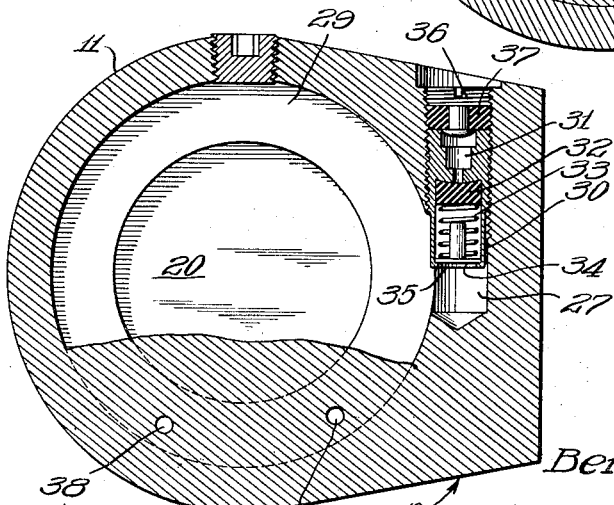
Figure 3 is a transverse sectional view taken substantially along line III—III of Figure 1.

Referring now in particular to the fluid inertia motor 75, said motor is shown in Figures 1 and 3 as comprising a rotor 96 having a shaft 97 extending in opposite directions therefrom and journaled in the casing member 76 at one of its ends and in the bearing plate 74 at its opposite end in the casing member 76 in antifriction bearing 98, 98. The rotor 96 is provided with a plurality of equally spaced radial sliding vanes 99, 99 as is usual with such fluid motors. The sliding vanes 99, 99 engage a spreader ring 100 at their inner ends and engage the inner periphery of a modulator ring 101 at their outer ends. The inner periphery of the modulator ring 101 is shown as being eccentric of the center of said ring. Teeth 103 are formed on the outer periphery of the modulator ring 101. Said teeth mesh with a pinion 104 on the inner end of an elongated rod or shaft 105 extending from the casing 76 and along the wing shaft 15 parallel to the rod 86 and out through the outer end of said wing shaft 15.

The shaft 105, like the rod 86, has a rectangular pin or key 106 extending transversely through its outer end portion and engaging the outer end face of the wing shaft 15 and abutted by a slotted annular nut 107 threaded on the end of said shaft into engagement with the pin or key 106. One end of the key 106 may be pointed for cooperation with suitable indicia (not shown) on the outer end face of the modulator shaft 15, for indicating the degree of eccentricity of the modulator ring 101 with respect to the center of the rotor 97 and the extent of fluid displacement through the vane motor. The inertia motor 75 may thus be accurately adjusted for attaining a substantial range of fluid inertia response in the displacement passageway of the damper, to meet a wide variety of operating conditions in a wide range of frequency-sensitive requirements.

Fluid is admitted to or released from the fluid motor 75, depending upon the direction of rotation of the housing 11, through a passageway 109 communicating with the outlet from the center of the orifice control valve 77 and with the working chambers formed between the vanes 99, 99 of the fluid motor. A second fluid passageway 110 is provided in the bearing block 74 and communicates with the working chambers formed in the spaces between the vanes 99, 99 and with the chamber 65 in the interior of the end closure plug 67.

It should be understood that when the housing 11 is rotating in one direction with respect to the wing shaft 15, that fluid from the orifice valve 77 enters the inertia motor 75 through the passageway 109 and rotates said motor and passes from said motor to the working chambers 40, 40 through the passageway 110, chamber 65, ports 71, 71 in the wall 69, annular passageway 70 and displacement ports 72, 72 in the wing shaft 15. In a contrary manner, when the housing 11 is turning in a reverse direction, fluid will enter the fluid motor 75 from the working chambers 40, 40 through the passageway 110 and will pass from said motor through the passageway 109, the orifice control valve 77 and the displacement ports 79 and 80, into the working chambers 39, 39.

The fluid inertia motor 75 thus imposes artificial fluid inertia upon the fluid passing through the opposed inertia passageways which is the equivalent of the passage of fluid through a much longer passageway than could be contained within the wing shaft 15, and the restricted orifice formed by the orifice control valve 77 acts as an energy-absorbing means, absorbing the energy transmitted by the fluid at relatively high frequencies and developing a resonant frequency in the damper during operation in a selected frequency range.

It should here be noted that the restricted orifice formed by the orifice control valve 77 in the orifice body 82 restricts the flow of fluid in both directions of operation of the flutter damper. In one direction the restriction is as the hydraulic fluid under pressure is forced from the working chambers 39, 39 by the restrictions of said chambers, and in the other direction is as the hydraulic fluid under pressure is forced into said working chambers by the restriction of the chambers 40, 40.

It may be seen from the foregoing that a novel and improved form of rotary piston flutter damper has been provided which is particularly adapted to dampen the flutter or vibration of the elevator, ailerons, flaps or the like, controlling operation of an airplane, and that this damper is of a small, compact size and acts on the principle of compensating for the elasticities of the fluid and damper by displacing the fluid from one working chamber to another through an artificial inertia passageway in the form of an inertia motor and by absorbing the energy of vibration through a cooperating metering orifice, so as to more effectively damp the flutter of the controlling members of the airplane by compensating for the elasticity of the system including the damping fluid therein.

It will be understood that modifications and variations may be effected without departing from the scope of the novel concepts of the present invention.

I claim as my invention:

1. In a flutter damper, a housing having a cylindrical chamber therein, an elongated rotary piston within said chamber, said chamber having fluid reaction members therein extending into slidable engagement with said rotary piston and cooperating therewith and dividing said chamber into a plurality of working chambers, displacement ports leading from said working chambers at points spaced therealong, and an artificial fluid inertia passageway connecting said displacement ports from opposed working chambers together and comprising a rotary inertia fluid motor compensating for the elasticity of the parts of said damper and the damping medium contained therein upon relative oscillatable movement between said housing and rotary piston.

2. In a flutter damper, a housing having a cylindrical chamber therein, an elongated rotary piston within said chamber, said chamber having a plurality of diametrically opposed fluid reaction members therein cooperating with said rotary piston and with said piston dividing said chamber into a plurality of working chambers, displacement ports leading from opposed working chambers at points spaced along said cylindrical chamber, and a rotary sliding vane inertia fluid motor connecting opposed displacement ports together, and providing an artificial inertia passageway of substantial length to compensate for elasticities in said damper and the damping fluid therein.

3. In a flutter damper, a housing having an elongated cylindrical chamber therein, an elongated rotary piston mounted within said chamber, said chamber having a plurality of diametrically opposed fluid reaction members therein extending into slidable engagement with said rotary piston and said piston having opposed vanes cooperating with said reaction members to form a plurality of complemental and opposed working chambers, displacement ports leading from said working chambers, and the displacement ports of opposed working chambers being spaced along said cylindrical chamber, energy absorbing means connected with said displacement ports leading from said complemental working chambers and an artificial fluid inertia passageway interposed between said energy absorbing means and said displacement ports leading from said opposed working chambers and comprising a rotary vane inertia fluid motor operated by the displacement of fluid therethrough upon relative rotational vibrational movement between said housing and piston.

4. A flutter damper of the character described comprising an elongated housing, said housing having an inner wall defining a cylindrical chamber, a wing shaft within said chamber and having wings slidably engaging said inner wall and forming a rotatable piston, a plurality of fluid reaction members extending inwardly from said inner wall and rigidly mounted within said housing in the spaces between the wings of said wing shaft and having slidable engagement with said wing shaft at their inner ends, the spaces between said reaction members and the wings of said wing shaft defining a plurality of complemental working chambers certain of which operate in opposed relation to the others, displacement ports connecting certain of said complemental working chambers together, other displacement ports connecting other complemental working chambers together, opposed to said first mentioned complemental working chambers, and an artificial fluid inertia passageway comprising a rotary fluid inertia motor communicating with said displacement ports and connecting the displacement ports of opposed complemental working chambers together and compensating for the elasticity of the hydraulic fluid and the parts of the damper when passing from one opposed working chamber to the other with a high degree of oscillation.

5. A flutter damper of the character described comprising an elongated housing having an inner wall defining a cylindrical chamber, a wing shaft pivotally mounted within said chamber and having a wing slidably engaging said inner wall, a divider within said chamber extending inwardly from said inner wall into slidable engagement with said wing shaft, said divider dividing said chamber into a plurality of working chambers one of which is opposed to the other, displacement ports leading from said working chambers, the ports from opposed working chambers being spaced axially along said housing, and energy absorption and cooperating elasticity compensating means connecting said working ports together and comprising a restricted orifice in communication with the displacement port from one of said chambers and a rotary vane fluid inertia motor having ports in series with said restricted orifice and the displacement port communicating with the other of said chambers.

6. A flutter damper of the character described comprising an elongated housing having an inner wall defining a cylindrical chamber, a wing shaft within said chamber, said wing shaft and housing being relatively movable with respect to each other and said wing shaft having a wing slidably engaging said inner wall, a fluid reaction divider rigidly mounted within said chamber and having slidable engagement with said wing shaft and dividing said chamber into a plurality of working chambers one of which is opposed to the other, displacement ports leading from said working chambers, a variable restricted orifice valve communicating with one of said displacement ports and a radial vane inertia fluid motor connected between said restricted orifice valve and the other of said working chambers.

7. A flutter damper of the character described comprising an elongated housing having an inner wall defining a cylindrical chamber, a wing shaft within said chamber and having wings slidably engaging said inner wall, a fluid reaction divider within said housing extending inwardly from said inner wall into slidable engagement with said wing shaft between the wings thereof, the adjacent edges of said wings and fluid reaction divider defining a plurality of opposed working chambers, a fluid displacement chamber within said wing shaft, a displacement port leading into said displacement chamber from one of said working chambers, a displacement port leading into said displacement chamber from another of said working chambers and spaced along said wing shaft from said first mentioned displacement port, and a rotary fluid inertia motor in said displacement chamber and having ports, connecting said displacement ports together, and forming an artificial fluid inertia passageway between opposed working cylinders.

8. A flutter damper of the character described comprising an elongated housing adapted for attachment to the inside of a pivotally mounted airfoil assembly and having an inner wall defining a cylindrical chamber, a wing shaft within said chamber, and adapted for attachment to a stationary part of the airfoil assembly, said wing shaft having wings slidably engaging said inner wall, a plurality of fluid reaction dividers within said inner wall and rigidly mounted within said housing in the spaces between the wings of said wing shaft and having slidable engagement with said wing shaft in the spaces between the wings thereof and with said wings defining a plurality of pairs of diametrically opposed working chambers, a fluid displacement chamber within said wing shaft, displacement ports leading from one pair of diametrically opposed working chambers and communicating with one end of said displacement chamber, displacement ports leading from another pair of diametrically opposed working chambers and communicating with the other end of said displacement chamber, and artificial inertia passageway means within said displacement chamber and comprising a rotary vane inertia fluid motor connected in series with said spaced displacement ports.

9. A flutter damper of the character described comprising an elongated housing adapted for attachment to the inside of a pivotally mounted airfoil assembly and having an inner wall defining a cylindrical chamber, a wing shaft within said chamber and adapted for attachment to a stationary part of the airfoil assembly and having spaced wings slidably engaging said inner wall, a plurality of fluid reaction dividers within said inner wall and rigidly mounted within said housing in the spaces between the wings of said wing shaft and having slidable engagement with said wing shaft in the spaces between the wings thereof and with said wings defining a plurality of pairs of diametrically opposed working chambers, a fluid displacement chamber within said wing shaft having a variable orifice valve chamber in communication with an end thereof, variable restricted orifice valve means within said valve chamber, and communicating with one end of said displacement chamber, displacement ports leading from one pair of diametrically opposed working chambers to said variable restricted orifice valve means, other displacement ports leading from another pair of diametrically opposed working chambers to the other end of said displacement chamber, and an artificial inertia passageway in said displacement chamber comprising a rotary fluid inertia motor having ports connecting said valve means with said other displacement ports.

10. A flutter damper of the character described comprising an elongated housing having an inner wall defining a cylindrical chamber, a wing shaft within said chamber and having wings slidably engaging said inner wall, a fluid reaction divider rigidly mounted within said housing in the space between the wings of said wing shaft and having slidable engagement with said wing shaft, and with said wings defining a plurality of pairs of diametrically opposed working chambers, a displacement chamber within said wing shaft, a variable restricted orifice valve wtihin said wing shaft and communicating with one end of said displacement chamber, a displacement port in said wing shaft and leading from one of said working chambers to said restricted orifice valve, another displacement port in said wing shaft and leading from said other working chamber to the other end of said displacement chamber, and artificial inertia passageway means within said displacement chamber in communication with said variable restricted orifice valve and said other displacement port and comprising a rotary vane fluid inertia motor reversely operable upon the transfer of fluid between opposed working chambers upon relative oscillative vibrational movement between said housing and wing shaft.

References Cited in the file of this patent

UNITED STATES PATENTS

| | | |
|---|---|---|
| 765,396 | Neuberth | July 19, 1904 |
| 1,876,862 | Cross | Sept. 13, 1932 |
| 1,876,863 | Cross | Sept. 13, 1932 |
| 2,286,291 | Magrum | June 16, 1942 |
| 2,419,651 | Magrum | Apr. 29, 1947 |
| 2,469,488 | Woods | May 10, 1949 |
| 2,516,781 | Magrum et al. | July 25, 1950 |